United States Patent
Tiwari et al.

(10) Patent No.: US 12,443,960 B2
(45) Date of Patent: Oct. 14, 2025

(54) MULTI-DIMENSIONAL CODED REPRESENTATIONS OF ENTITIES

(71) Applicant: PAYPAL, INC., San Jose, CA (US)

(72) Inventors: Suryadeep Tiwari, Chennai (IN); Vidhya Chandrasekaran, Chennai (IN); Angadhjot Hundal, San Francisco, CA (US); Richard Yen-Ching Lee, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 148 days.

(21) Appl. No.: 18/052,743

(22) Filed: Nov. 4, 2022

(65) Prior Publication Data

US 2024/0095743 A1 Mar. 21, 2024

(30) Foreign Application Priority Data

Sep. 15, 2022 (IN) .............................. 202241052677

(51) Int. Cl.
*G06Q 20/40* (2012.01)
*G06Q 30/0204* (2023.01)
*G06Q 30/0601* (2023.01)

(52) U.S. Cl.
CPC ..... *G06Q 20/4016* (2013.01); *G06Q 30/0205* (2013.01); *G06Q 30/0601* (2013.01)

(58) Field of Classification Search
None
See application file for complete search history.

(56) References Cited

U.S. PATENT DOCUMENTS

2022/0374891 A1* 11/2022 Zhang ................. G06Q 20/401

* cited by examiner

*Primary Examiner* — Matthew S Gart
*Assistant Examiner* — Amit Patel
(74) *Attorney, Agent, or Firm* — Haynes and Boone, LLP

(57) ABSTRACT

Methods and systems are presented for providing a framework that enables a computer system to analyze and compare changes to different account characteristics of different accounts that occurred over a time period. A code is generated for an account to represent changes to different account characteristics of the account within the time period. Changes to different account characteristics may be highlighted in the code using different colors or patterns. By analyzing the code, overlapping changes from different account characteristics that occurred within the same time frame may be detected. The different change patterns associated with the user account may then be used to assess a risk for the user account and/or a transaction involving the user account.

20 Claims, 8 Drawing Sheets

| User ID | Device Name | Browser Type | Channel |
|---|---|---|---|
| 1543 (XYZ Corp.) | [Motorola, Motorola, Samsung, Motorola, Motorola...] | [Android Browser, Android Browser, Android Browser...] | [App, App, Web, App, App...] |
| 2436 (ABC Logistics) | [Samsung, Samsung, Samsung, Apple, Samsung...] | [Android Browser, Android Browser, Android Browser, Safari...] | [App, App, App, Web, App...] |

Channel-2 (Blue)

Figure 3B

MULTI-DIMENSIONAL CODED REPRESENTATIONS OF ENTITIES

CROSS REFERENCE TO RELATED APPLICATION

The present claims priority to India Provisional Patent Application Serial No. 202241052677, filed Sep. 15, 2022, which is incorporated herein by reference in its entirety.

BACKGROUND

The present specification generally relates to analysis of machine-readable codes, and more specifically, to generating and analyzing machine-readable codes that represent changes to various entities according to various embodiments of the disclosure.

RELATED ART

Service providers that provide electronic services to various users often analyze attributes associated with the users prior to performing the services. For example, when a user submits a request to process an electronic transaction (e.g., a payment transaction, a data access transaction, a login transaction, etc.), a service provider may assess a risk associated with the electronic transaction based on attributes associated with the user, such as a transaction history of the user, a location of the user, a type of device used by the user to conduct the electronic transaction, etc. If the electronic transaction is conducted with another entity, the service provider may also analyze attributes associated with the other entity and the relationship between the user and the other entity.

To analyze the user and/or the entity, the service provider would access data stored in one or more data structures that represents information about the user and/or the entity. The data structures may include a database, a data object, a graph, etc., and are typically configured to store static data that represents a particular state (e.g., a current state, etc.) of the user and/or the entity. Due to the limitations of these types of data structures, it is a challenge for the service provider to analyze changes that occurred to the user and/or the entities, and compare the changes with other users. As such, there is a need for providing a framework for analyzing and comparing changes that have occurred to various users and/or user accounts.

BRIEF DESCRIPTION OF THE FIGURES

FIGS. 3A-3C illustrate example account characteristics in different categories according to an embodiment of the present disclosure;

Figure 1:
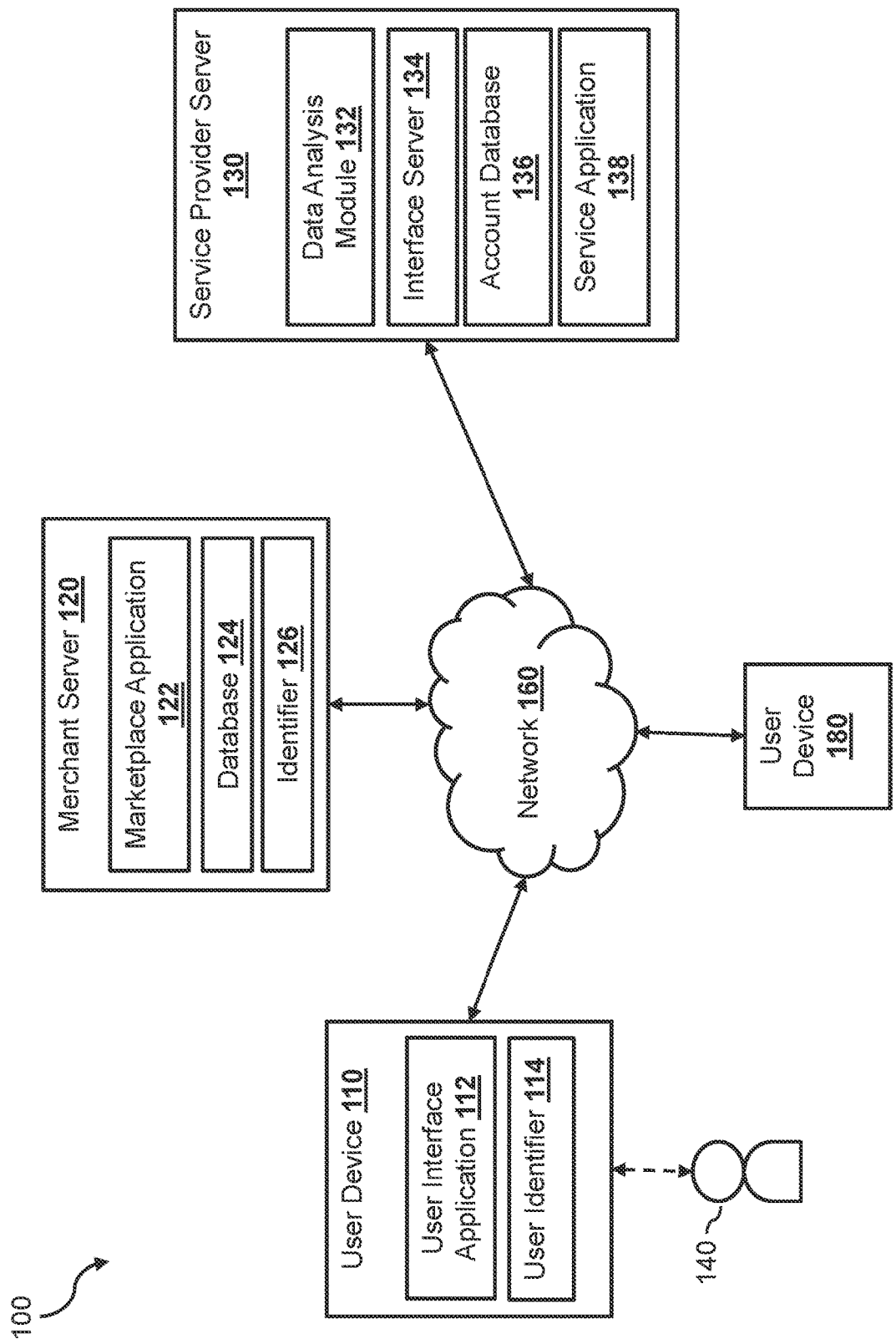
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a framework that enables a computer system to analyze and compare changes to different account characteristics of different accounts that occurred over a time period. As discussed herein, data structures that organizations usually use for storing data associated with users and/or user accounts are typically configured to store static information, that is, information that represents account characteristics in a particular state (e.g., in a current state, etc.). For example, a database is configured to store data in a tabular format including rows and columns. Each row may include data that represents attributes that are associated with a particular account at a particular time frame, such as a current residential address of a user, a current email address of the user, a current phone number of the user, a current income level of the user, current financial accounts associated with the user, and the like. As an attribute of the user changes (e.g., the user moves to a different location, etc.), the data in a corresponding field (e.g., a residential address field) may be updated to reflect the change. As such, the data stored in the table represents a current set of information associated with the various user accounts. While a database can also store historic data (e.g., previous versions of the attributes, historic transactions, etc.), it is a challenge to present, access, and analyze the changes that occur to the accounts over any period of time without requiring substantial computer resources to compile and analyze the static data in the database.

In another example, a graph can be configured to store relationship information among different entities and/or assets. However, similar to a database, a graph is typically configured to store static data that represents a current state of the relationships among the entities and/or assets. When a relationship attribute changes (e.g., a user account begins to share a credit card with another user account, a new transaction conducted between two user accounts, etc.), the data in the graph is updated with the changed information such that the graph reflects the change of the relationship attribute. Thus, it is also a challenge to present, access, and analyze changes to different data in the graph.

As such, according to various embodiments of the disclosure, a data analysis system may use a multi-dimensional code to represent changes across different account characteristics for an account (e.g., a user account, a merchant account, etc. with a service provider) within a time period. In some embodiments, the code may indicate changes across the different account characteristics for the account over a time period (e.g., 30 days, 6 months, a year, etc.). The time period may be divided into multiple time frames. For example, when the time period is 30 days, each time frame may represent a distinct day within the 30-day period. In another example, when the time period is 6 months, each time frame may represent a distinct week within the 6-month period.

The data analysis system may generate a code having a first dimension (e.g., a time dimension) corresponding to the time period. Thus, the code may be divided into multiple sections, where each section represents a respective time frame within the time period. When an account characteristic is changed during a particular time frame within the time period, the data analysis system may highlight a section within the code that corresponds to the particular time frame. The highlighting of the section can be implemented in different ways. For example, the data analysis system may fill the section of the code with a solid color while leaving other sections (sections corresponding to time frames during which no changes of the account characteristic have occurred) empty (or in a different color such as a black color). In another example, the data analysis system may provide a particular pattern in the section that is different from the patterns (or patterns) used in other sections.

The account characteristic represented by the code may correspond to any attribute associated with the account. For example, the account characteristic may correspond to a residential address of a user, a funding source used by the user, a number of login attempts per day by the user, or any other attributes that can be used by a service provider to analyze the user account. In some embodiments, the code generated by the data analysis system may represent changes to multiple account characteristics associated with the user account. Thus, the code may have a second dimension (e.g., characteristic dimension) corresponding to the different account characteristics. The data analysis system may divide the code along the characteristic dimension into multiple sections, where each section corresponds to a respective account characteristic.

A two-dimensional code generated by the data analysis system may be divided into multiple two-dimensional areas (also referred to as "blocks"), where each area (e.g., each block) within the code may correspond to an intersection between a particular time frame and a particular account characteristic, and represent whether a change occurs for that particular account characteristic during the particular time frame. The data analysis system may highlight an area within the code to indicate a change has occurred for the corresponding account characteristic during the corresponding time frame using the techniques disclosed herein. Using this two-dimensional code generated by the data analysis system to represent an entity (e.g., an account), any changes related to the user account that occurred within the time period can be immediately identified without compiling and analyzing a large volume of data. For example, a computer system configured to analyze a risk associated with a user account based on changes that occurred to the user account can perform the analysis quickly and efficiently using the code generated by the data analysis system.

In some embodiments, the account characteristics associated with a user account can be grouped into different characteristic categories. For example, a user account may be associated with characteristics related to demographics of a user (e.g., a residential address, an income level, an educational level, etc.), characteristics related to behavior of a user (e.g., a time of day for performing a certain type of transaction, a network address of a device used by a user, an application used by a user to perform a transaction, a cursor moving pattern while interacting with an electronic user interface, a clicking pattern while interacting with an electronic user interface, a browsing pattern while traversing a website, etc.), characteristics related to transactions conducted by a user (e.g., a transaction pattern, an average transaction amount, merchandise categories, a payment method, a payment status, whether a credit is used, etc.), and other categories. Characteristics can be set by the system and can overlap if desired. For example, a characteristic of user or device location where transactions are conducted can be part of a category related to transactions and/or to behavior.

Information related to changes made to the different characteristic categories over the time period may be relevant in analyzing a user account. For example, changes to a demographic characteristic (e.g., a shipping address) and changes to a transactional characteristic (e.g., an increase in transaction amount by more than a threshold) that occur substantially concurrently (e.g., happens within a predetermined amount of time such as within the same time frame, etc.) for the same user account may indicate that the user account has been taken over by a malicious user. Similarly, changes to a behavioral characteristic (e.g., a clicking pattern, etc.) and changes to a transactional characteristic (e.g., an increase in transaction amount by more than a threshold) that occur substantially concurrently (e.g., happens within a predetermined amount of time such as within the same time frame, etc.) for the same user account may also indicate that the user account has been taken over by a malicious user. In yet another example, accounts that experience very few (or no) activities in all three characteristic categories in a first period followed by activities in all three characteristic categories in a second period may indicate that the user associated with the user account has recently become active. Furthermore, the data analysis system may determine that accounts that have experienced similar change patterns share common characteristics, such that a behavior of an account can be inferred and/or predicted based on behavior of other accounts that have similar change behavior.

Thus, in some embodiments, the data analysis system may generate a code (also referred to as a "multi-dimensional code," "a three-dimensional code," or a "merged code") that represents changes across multiple categories (e.g., multiple domains) in different time frames for an account such that the changes can be presented, viewed, and analyzed in an efficient manner. In this regard, the data analysis system may generate a code that includes a third dimension (e.g., a category dimension). To implement this third dimension, the data analysis system may generate multiple two-dimensional codes for the respective account categories. For example, the data analysis system may generate a two-dimensional code for the demographic category representing changes to different demographic characteristics associated with the user account during different time frames within the time period. The data analysis system may also generate a two-dimensional code for the behavior category representing changes to different behavioral characteristics associated with the user account during different time frames within the time period. The data analysis system may also generate a two-dimensional code for the transaction category representing changes to different transactional characteristics associated with the user account during different time frames within the time period. If the data analysis system has determined more categories, additional two-dimensional codes corresponding to the other categories can be generated as well.

Once the two-dimensional codes are generated, the data analysis system may merge the two-dimensional codes based on the time dimension, such that the time dimension of the different codes are aligned. After the merging, the merged code becomes three-dimensional as it represents changes across different characteristic dimensions over the time period. In some embodiments, in order to differentiate the changes related to the different categories, the data analysis system may implement different indications (e.g., different highlights) in the code to represent the changes for the different categories. For example, the code may be color-coded, and changes in each category may be represented by a respective color. Thus, the data analysis system may use a first color (e.g., red) to implement the two-dimensional code associated with the demographic category, may use a second color (e.g., blue) to implement the two-dimensional code associated with the behavior category, and may use a third color (e.g., green) to implement the two-dimensional code associated with the transactional category. Using such a color-coding implementation, the merged code may include multiple colors. Since each color represents changes related to a corresponding category, one (e.g., a human analyzer, a computer system) can easily identify changes to different characteristics in the different categories for a user account based on accessing and/or analyzing the code. Furthermore, when changes related to multiple categories occurred within the same time frame, the different colors corresponding to the different categories may merge to generate a combined color. For example, when changes to both the demographic category and the behavior category occurred within the same time frame, a purple color (e.g., merging the red color and the blue color) may appear in the area corresponding to the time frame. Instead of colors, other implementations or visual indicators (e.g., line patterns, dot patterns, etc.) may be used by the data analysis system to differentiate the changes related to different categories in the code.

Using the three-dimensional codes to represent entities (e.g., user accounts, etc.), the data analysis system can analyze changes to different account characteristics over a time period, and also overlapping changes of characteristics across different categories over the time period efficiently without having to compile and analyze a large volume of data. Furthermore, the three-dimensional codes also enable the data analysis system to easily compare change patterns between multiple entities (e.g., user accounts, etc.) by comparing codes associated with different accounts.

In some embodiments, the data analysis system may generate a multi-dimensional code for each user account of a service provider. The multi-dimensional codes may be stored in a data storage and may be linked to the corresponding user accounts. As such, when the data analysis system is requested to analyze or otherwise is triggered to analyze one or more user accounts, the data analysis system may retrieve the corresponding multi-dimensional codes, and may analyze the one or more user accounts based on the multi-dimensional codes. For example, the data analysis system may be requested to analyze a first user account when the first user account is involved in an electronic transaction (e.g., a login transaction, a data access transaction, an electronic payment transaction, etc.). The data analysis system may retrieve a first code generated for the first user account. In some embodiments, the data analysis system may use a machine learning model to predict a risk associated with the first user account based on attributes associated with the code. The data analysis system may provide the code as one or more inputs to the machine learning model. In some embodiments, the data analysis system may provide the code in an image format to the machine learning model. In some embodiments, the data analysis system may derive attributes (e.g., encoding the code into a set of features) associated with the code, and provide the attributes as input values to the machine learning model. The data analysis system may then determine a risk for the first user account based on an output from the machine learning model.

In some embodiments, the data analysis system may determine a second user account that is also involved in the electronic transaction (e.g., a payor and a payee in a fund transfer transaction, etc.). The data analysis system may retrieve a second code generated for the second user account, and may compare the first code against the second code. For example, if the data analysis system detects that both the first code and the second code exhibit a common change pattern (e.g., both codes indicate a recent change to both the demographic characteristics and the transaction characteristics in the same time frame), the data analysis system may determine that the transaction may correspond to a fraudulent transaction, and may increase a risk associated with the electronic transaction.

In some embodiments, the data analysis system may cluster the first code with other codes that exhibit similar patterns. The data analysis system may then analyze the other user accounts associated with the codes within the same cluster, and may assess a risk associated with the first user account based on the analysis of the other user accounts. For example, if the data analysis system determines that over a threshold number (or percentage) of user accounts within the cluster corresponds to malicious user accounts (e.g., user accounts through which fraudulent transactions have been conducted), the data analysis system may increase the risk associated with the first user account and take appropriate actions, such as requiring additional authentication.

In some embodiments, the data analysis system may use the multi-dimensional codes for other purposes in addition to risk assessment. For example, the data analysis system may determine that certain patterns (e.g., indicating little or no changes to the characteristics over a recent period of time) in the codes may indicate a potential market opportunity. Thus, the data analysis system of some embodiments, may identify a set of codes that exhibit the predetermined pattern, and may perform one or more actions to the accounts associated with the set of codes. The actions may include transmitting promotional materials (e.g., an incentive such as a coupon, etc.) to the user devices associated with the user accounts, transmitting recommendations of products or services to the user devices, etc.

Another feature of the data analysis system is the use of different edge devices to perform the training and prediction of risks using the multi-dimensional codes. Since the correlations between users' behaviors and users' risks may be stronger when the users are localized within a geographical region, in some embodiments, the training and prediction of the machine learning models that are configured to use a multi-dimensional code representing a user to predict a risk for the user (or transactions associated with the user) may be performed at edge devices (e.g., devices that are located at an area corresponding to the user). The edge device may obtain multi-dimensional codes of different users that are located within a region corresponding to the edge device, and may train the machine learning models using the obtained multi-dimensional codes. Since the users who are represented by the multi-dimensional codes are located within the same geographical region, the correlations between their behaviors (e.g., changes to their demographic characteristics, changes to their behavioral characteristics, changes to their transactional characteristics, etc.) and their risk profiles may be stronger than users that are located in different regions. As such, the machine learning models that are trained using the multi-dimensional codes representing the local users may perform more accurate predictions for the users located within the region.

FIG. 1 illustrates an electronic transaction system 100, within which the data analysis system may be implemented according to one embodiment of the disclosure. The electronic transaction system 100 includes a service provider server 130, a merchant server 120, and user devices 110 and 180 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant server 120, the user device 180, and/or the service provider server 130 over the network 160. For example, the user 140 may use the user device 110 to conduct an online purchase transaction with the merchant server 120 via websites hosted by, or mobile applications associated with, the merchant server 120. The user 140 may also log in to a user account to access account services or conduct electronic transactions (e.g., account transfers, payments, data access, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120, the user device 180, and/or the service provider server 130 over the network 160. For example, via the UI application 112, the user 140 may submit a transaction request to the service provider server 130 (e.g., a request to register a user account, a request to log in to a user account, a fund transfer request, a request to access data hosted by the service provider server 130, etc.). In one implementation, the user interface application 112 includes a software program (e.g., a mobile application) that provides a graphical user interface (GUI) for the user 140 to interface and communicate with the service provider server 130, the user device 180, and/or the merchant server 120 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the merchant server 120, the user device 180, and/or the service provider server 130.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant associated with the merchant server 120, to provide information associated with the new funding account, to initiate an electronic payment transaction with the service provider server 130, to apply for a financial product through the service provider server 130, to access data associated with the service provider server 130, etc.).

The user device 180 may have similar components as the user device 110 and may enable another user associated with the user device 110 to interact (perform transactions with) the merchant server 120, the user device 110, and the service provider server 130.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. The merchant server 120 may include a merchant database 124 for identifying available items or services, which may be made available to the user devices 110 and 180 for viewing and purchase by the user.

The merchant server 120, in one embodiment, may include a marketplace application 122, which may be configured to provide information over the network 160 to the user interface application 112 of the user device 110 and to the user device 180. In one embodiment, the marketplace application 122 may include a web server that hosts a merchant website for the merchant. For example, the user 140 of the user device 110 and the user of the user device 180 may interact with the marketplace application 122 through the user interface application 112 over the network 160 to search and view various items or services available for purchase in the merchant database 124. The merchant server 120, in one embodiment, may include at least one merchant identifier 126, which may be included as part of the one or more items or services made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

While only one merchant server 120 is shown in FIG. 1, it has been contemplated that multiple merchant servers, each associated with a different merchant, may be connected to the user devices 110 and 180, and the service provider server 130 via the network 160.

The service provider server 130, in one embodiment, may be maintained by a transaction processing entity or an online service provider, which may provide processing for electronic transactions between the user 140 of user device 110, the user of the user device 180, and one or more merchants. As such, the service provider server 130 may include a service application 138, which may be adapted to interact with the user devices 110 and 180, and/or the merchant server 120 over the network 160 to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user devices 110 and 180 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, the user of the user device 180, or a merchant associated with the merchant server 120, etc.) may access a user account associated with the user and access various services offered by the service provider server 130, by generating HTTP requests directed at the service provider server 130. For example, the user 140 may submit a transaction request via the interface generated by the interface server 134.

The service provider server 130, in one embodiment, may be configured to maintain one or more accounts (e.g., user accounts, merchant accounts, etc.) in an account database 136, each of which may be associated with a profile and may include account information associated with one or more individual users (e.g., the user 140 associated with user device 110, the user associated with the user device 180, etc.) and merchants. For example, account information may include user information such as a gender, an address, an education level, an income level, an email address, etc., financial information such as bank account identifiers, payment card identifiers, etc., credential information such as such as one or more account numbers, passwords, transaction history, device information such as an Internet Protocol (IP) addresses, a device identifier, a device type, etc., and other information related to the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes a data analysis module 132 that implements the data analysis system as discussed herein. The data analysis module 132 may be configured to generate, present, and analyze codes that represent changes to various account characteristics associated with different accounts with the service provider server 130. For example, the data analysis module 132 may generate a code for each account with the service provider server 130. Each code generated by the data analysis module 132 may represent changes to various characteristics associated with a corresponding account over a time period. When the service provider server 130 receives a transaction request (e.g., a request to log in to a corresponding account, a request to access data, a request to perform an electronic payment transaction, etc.) associated with an account from a device (e.g., the user device 110, the user device 180, the merchant server 120, etc.), the service provider server 130 may request the data analysis module 132 to analyze the transaction request and/or the account. In some embodiments, the service provider server 130 may request the data analysis module 132 to analyze a risk associated with the transaction request and/or the account, and may process the transaction request based on the assessed risk determined by the data analysis module 132. In some embodiments, the data analysis module 132 may assess the risk associated with the transaction request and/or the account based on a code generated for the account.

Figure 2:
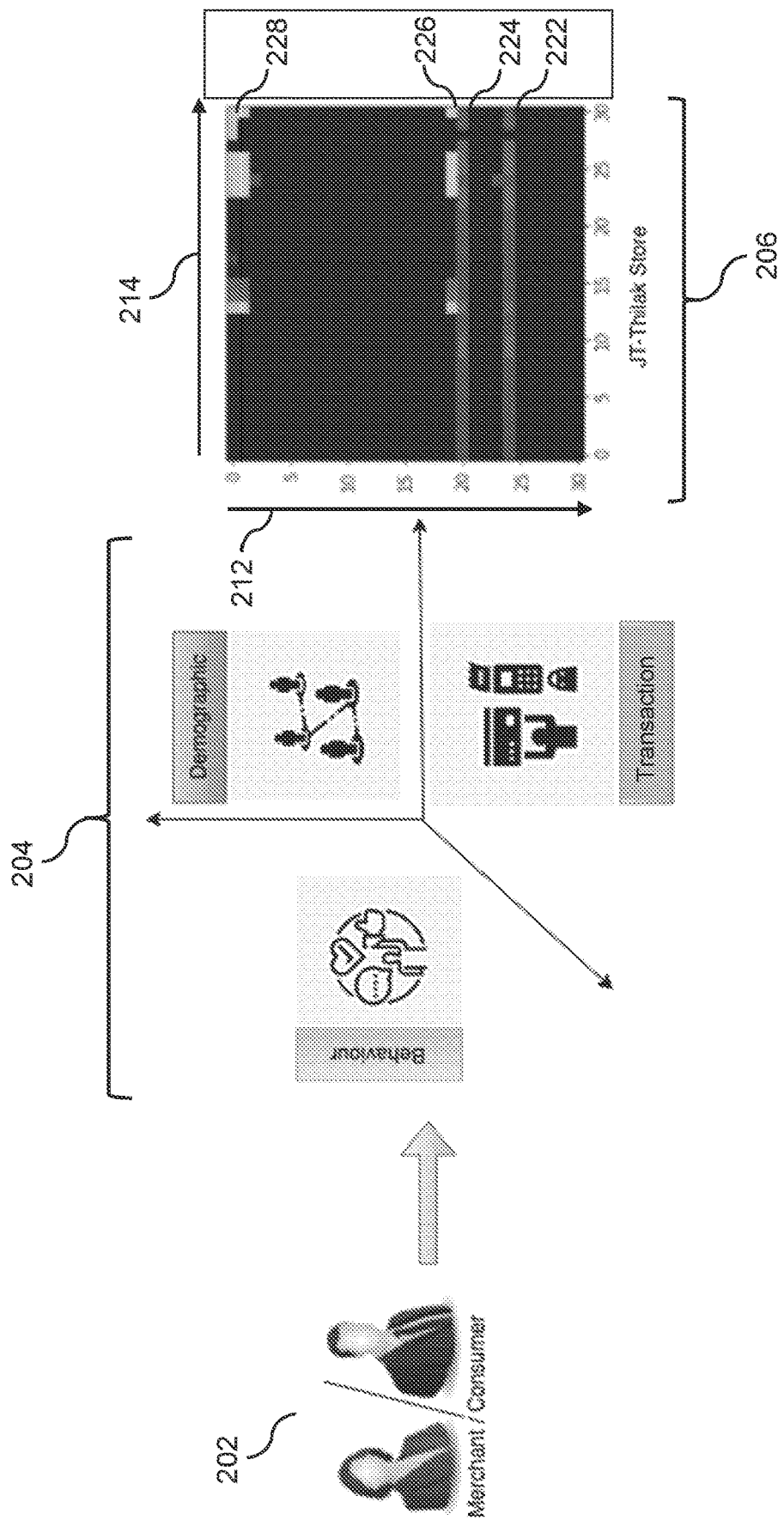
FIG. 2 illustrates an example data flow for generating a code that represents changes to an account according to an embodiment of the present disclosure.

FIG. 2 illustrates an example data flow for generating a multi-dimensional code for an account according to an embodiment of the disclosure. In some embodiments, the data analysis module 132 may generate a code for each account (e.g., a user account corresponding to a user such as the user 140, the user of the user device 180, etc., a merchant account corresponding to a merchant such as the merchant associated with the merchant server 120, or other types of accounts) with a service provider corresponding to the service provider server 130. The code may represent changes to different characteristics associated with the corresponding account during a time period, which may be used subsequently for further analyses and comparisons (e.g., assessing a risk associated with a transaction request and/or an account). As shown in FIG. 2, the data analysis module 132 may generate a code (also referred to as a "multi-dimensional code," "a three-dimensional code," or a "merged code") for an account 202. The account may correspond to an entity, such as a user, a merchant, a business, etc. that has been registered with the service provider server 130 to use services provided by the service provider server 130.

In some embodiments, since each code corresponds to a particular time period, the data analysis module 132 may first determine the time period that the code represents the account 202. For example, the data analysis module 132 may determine the most recent 30 days as the time period for the code. The data analysis module 132 may then divide the time period into multiple time frames. In the example where the time period corresponds to the most recent 30 days, the data analysis module 132 may divide the time period into 30 different time frames, where each time frame corresponds to a distinct day within the recent 30 day time period. The data analysis module 132 may then determine, for the account 202, change data representing changes to one or more characteristics associated with the account 202 during the time period.

The service provider server 130 may store data associated with each of its registered entities in the account database 136. Thus, the data analysis module 132 may access the data associated with the account 202 in the account database 136. The data analysis module 132 may determine any changes that have occurred to any of the data stored in the account database 136. For example, the data analysis module may access a change log to the account database 136 to determine whether any data associated with the account 202 has been changed during the time period. The data analysis module 132 may determine the change data based on the change log. The change data may indicate which data attribute has been changed, and at which time that data attribute has been changed. The data analysis module 132 may then generate a code 206 based on the change data.

As discussed herein, the data analysis module 132 may categorize the various characteristics associated with an account into different categories. In one example, the data analysis module 132 may categorize the characteristics of the account 202 into three different categories 204: a demographic category, a behavior category, and a transaction (e.g., monetary) category. The number of categories can be reduced or increased as desired, such as based on a desire for more granularity. Categories can be combined or split into two or more categories. Different types of categories can be added or replaced. In certain situations, a lower number of categories may be desired based on the type of account, user, and other factors, where the lower number still provides accurate results without the additional processing needed for more categories. Based on the three categories 204, the data analysis module 132 may generate three different intermediate codes for the account 202, where each intermediate code represents changes in characteristics in a corresponding category over the time period. Thus, the data analysis module 132 may generate a first intermediate code that represents changes in demographic characteristics associated with the account 202, a second intermediate code that represents changes in behavioral characteristics associated with the account 202, and a third intermediate code that represents changes in transactional characteristics associated with the account 202.

Each of the intermediate code may be two-dimensional, having a first dimension (e.g., a dimension 212) corresponding to the time period, and a second dimension (e.g., a dimension 214) corresponding to the characteristic dimension. The data analysis module 132 may divide each intermediate code along the time dimension 212 into multiple sections based on the number of time frames are included within the time period, where each section along the time dimension 212 represents a distinctive time frame. When the time period (e.g., 30 days) is divided into 30 different time frames, where each time frame corresponds to a distinctive day, the data analysis module 132 may assign each section along the time dimension 212 of the intermediate code to a distinct day within the 30-day time period.

The data analysis module 132 may also divide each intermediate code along the characteristic dimension 214 into multiple sections based on the number of characteristics within the corresponding characteristic category represented by the intermediate code. For example, if the first intermediate code represents changes to 30 different demographic characteristics, the data analysis module 132 may divide the first intermediate code along the characteristic dimension 214 into 30 different sections, each corresponding to a distinctive demographic characteristic.

Based on the divided sections along the time dimension 212 and the divided sections along the characteristic dimension 214, each intermediate code may be divided into multiple two-dimensional areas (also referred to as blocks) within the intermediate code. Each area may correspond to an intersection between a section corresponding to a time frame along the time dimension 212 and a section corresponding to a characteristic along the characteristic dimension 214, and may represent information related to whether a change has occurred to the corresponding characteristic during the corresponding time frame. Each intermediate code may be generated to initially have void (e.g., blank) in every area. The data analysis module 132 may then modify one or more of the areas within each intermediate code based on the change data. For example, when the change data indicates that a particular demographic characteristic (e.g., an education level, etc.) has been updated for the account 202 during a particular time frame (e.g., 3 days ago), the data analysis module 132 may modify (e.g., highlight) the area within the first intermediate code, such that the highlighted area appears differently from the other areas. The highlighting can be implemented using a specific color (or a specific pattern) assigned to the corresponding characteristic category. This way, each intermediate code may have a different appearance (e.g., a different highlighted color, a different highlighted pattern, etc.). For example, the data analysis module 132 may use the color red to highlight the areas in the first intermediate code representing changes to the demographic characteristics of the account 202, the data analysis module 132 may use the color blue to highlight the areas in the second intermediate code representing changes to the behavioral characteristics of the account 202, and the data analysis module 132 may use the color green to highlight the areas in the third intermediate code representing changes to the transactional characteristics of the account 202.

After generating the intermediate codes, the data analysis module 132 may merge the intermediate codes along the time dimension 212 to form the multi-dimensional code 206 for the account 202. Thus, the merged code 206 (e.g., the multi-dimensional code 206) has three dimensions, with the third dimension corresponding to the different characteristic categories. In some embodiments, the third dimension may not be presented as an additional dimension in the rendering of the merged code 206. Instead, after the merging of the different intermediate codes, the data analysis module 132 may use the different highlighting (e.g., different colors, different patterns, etc.) to represent the third dimension. By merging the different intermediate codes, the data analysis module 132 may combine the highlighted areas from the different intermediate codes in the merged code 206. When the different intermediate codes use different colors to highlight areas corresponding to changes, the data analysis module 132 may combine the colors in an area where changes to two or more categories have occurred during the same time frame while merging the intermediate codes. Thus, a time frame during which demographic characteristics and behavioral characteristics have been changed (or updated), the data analysis module 132 may use a purple color (combining red and blue) to fill that area in the code 206. In another example, a time frame during which demographic characteristics and transactional characteristics have been changed (or updated), the data analysis module 132 may use a yellow color (combining red and green) to fill that area in the code 206.

As shown in FIG. 2, the code 206 includes highlighted sections 222, 224, 226, and 228 that represents changes to different characteristics at different time frames. Specifically, the highlighted section 222 includes multiple areas highlighted in red and purple (not shown in the black and white figure), that represent changes to various characteristics during a time frame corresponding to day 24 in the time period. The areas that are highlighted in red represent changes to the corresponding demographic characteristics of the account 202, and the areas that are highlighted in purple represent changes to both the corresponding demographic characteristics and the behavioral characteristics of the account 202. Similar to the section 222, the highlighted section 224 also includes multiple areas that are highlighted in red and purple. The highlighted areas in the section 224 represent changes occurred during a time frame corresponding to day 20 of the time period. Sections 226 and 228 include multiple highlighted areas that are highlighted in green, representing changes to behavioral characteristics of the account 202 during the corresponding time frames. After generating the code 206, the data analysis module 132 may store the code in a data storage (e.g., the account database), and may subsequently retrieve and use it for analyzing the account 202 and/or transactions that involve the account 202.

Figure 3A:
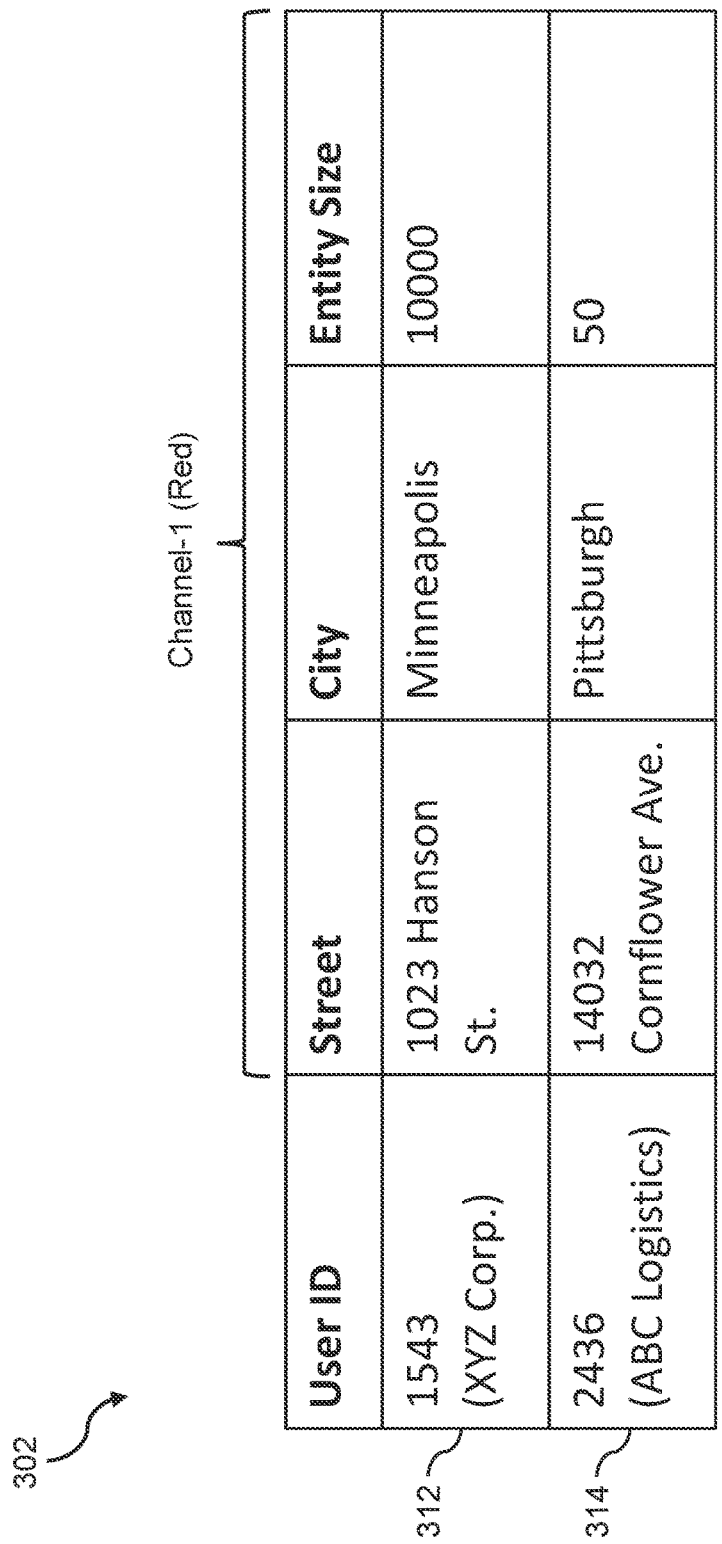

FIG. 3A illustrates example demographic characteristics associated with various accounts according to one embodiment of the disclosure. As shown, FIG. 3A includes a table 302 that is part of a database (e.g., part of the account database 136, etc.). The table 302 includes two rows 312 and 314 corresponding to different accounts. For example, the row 312 stores data associated with an account for a company called "XYZ Corp." while the row 314 stores data associated with an account for a company called "ABC Logistics." The demographic characteristics that are represented in the code generated by the data analysis module 132 (e.g., the code 206) may include a street address of an entity, a city address of the entity, and an entity size of the entity. Additional demographic characteristics that are not shown in the table 302 may also be represented in the code. Furthermore, it is noted that the table 302 includes data associated with different merchants. Thus, the demographic characteristics shown in the table 302 are specific to merchant accounts, and demographic characteristics that are represented by a code for a user account may include different demographic characteristics, such as an education level, an income level, a gender, etc.

In some embodiments, the data analysis module 132 may determine whether any of the fields in the table 302 associated with an account (e.g., the account 202) has been changed (or updated) during the time period. If it is determined that a particular field (e.g., a street address, an entity size, an education level, etc.) associated with the account has been changed during the time period, the data analysis module 132 may generate change data based on the change, and generate the first intermediate code by highlighting the area(s) that correspond to the change characteristic(s) in the corresponding format (e.g., filling the area(s) in red, etc.).

FIG. 3B illustrates example behavioral characteristics associated with various accounts according to one embodiment of the disclosure. As shown, FIG. 3B includes a table 304 that is part of a database (e.g., part of the account database 136, etc.). The table 304 includes two rows 322 and 324 corresponding to different accounts. For example, the row 322 stores data associated with an account for a company called "XYZ Corp." while the row 324 stores data associated with an account for a company called "ABC Logistics." The behavioral characteristics that are represented in the code generated by the data analysis module 132 (e.g., the code 206) may include characteristics related to a device name, a browser type, and a transactional channel, used by the corresponding entity when interacting with the service provider server 130 (e.g., browsing a website hosted by the service provider server 130, logging in to an account with the service provider server 130, transmitting a transaction request to the service provider server 130, etc.). Additional behavioral characteristics that are not shown in the table 304 may also be represented in the code. In each of the rows 322 and 324, the table 304 presents a series of data under each behavioral characteristic.

Each series of data indicates the corresponding behavioral characteristic associated with previous interactions with the service provider server 130. For example, under the behavior characteristic "device name," the table 304 includes a series of data representing the various devices used by the corresponding entity to interact with the service provider server 130 during the previous interactions. In this example, the row 322 indicates that the account for company "XYZ Corp." has used the following devices: a Motorola® device, a Motorola® device, a Samsung® device, a Motorola® device, a Motorola® device, etc. during the various interactions with the service provider server 130 in the past. The row 324 indicates that the account for company "ABC Logistics" has used the following devices: a Samsung® device, a Samsung® device, a Samsung® device, an Apple® device, a Samsung® device, etc. during the various interactions with the service provider server 130 in the past. By tracing the different timestamps associated with the different past interactions between the entity and the service provider server 130, the data analysis module 132 may determine whether a change to the device name characteristic has occurred during the time period. When there is a change in the device name (e.g., a change from Motorola® device to Samsung® device or vice versa, a change from Samsung® device to Apple® device or vice versa, etc.) within the time period, the data analysis module 132 may generate change data based on the change.

The table 304 also includes series of data for each of the other behavioral characteristics, such as the "browser type" characteristic and the "channel" characteristic. For example, under the "browser type" characteristic, the table 304 includes data that represents the different types of browsers (e.g., an Android® browser, a Safari® browser, etc.) used by accounts of each of the entities when interacting with the service provider server 130. Under the "channel" characteristic, the table 304 includes data that represents the different types of channels (e.g., a web channel, an application channel, etc.) used by accounts of the entities when interacting with the service provider server 130. When the data analysis module 132 determines a change in any of these two behavioral characteristics (e.g., a change from an Android® browser to a Safari® browser, a change from a web channel to an application channel, etc.) have occurred within the time period, the data analysis module 132 may generate corresponding change data to represent such changes. The data analysis module 132 may then generate the second intermediate code based on the change data, for example, by highlighting the area(s) that correspond to the change characteristic(s) in the corresponding format (e.g., filling the area(s) in blue, etc.).

Figure 3C:
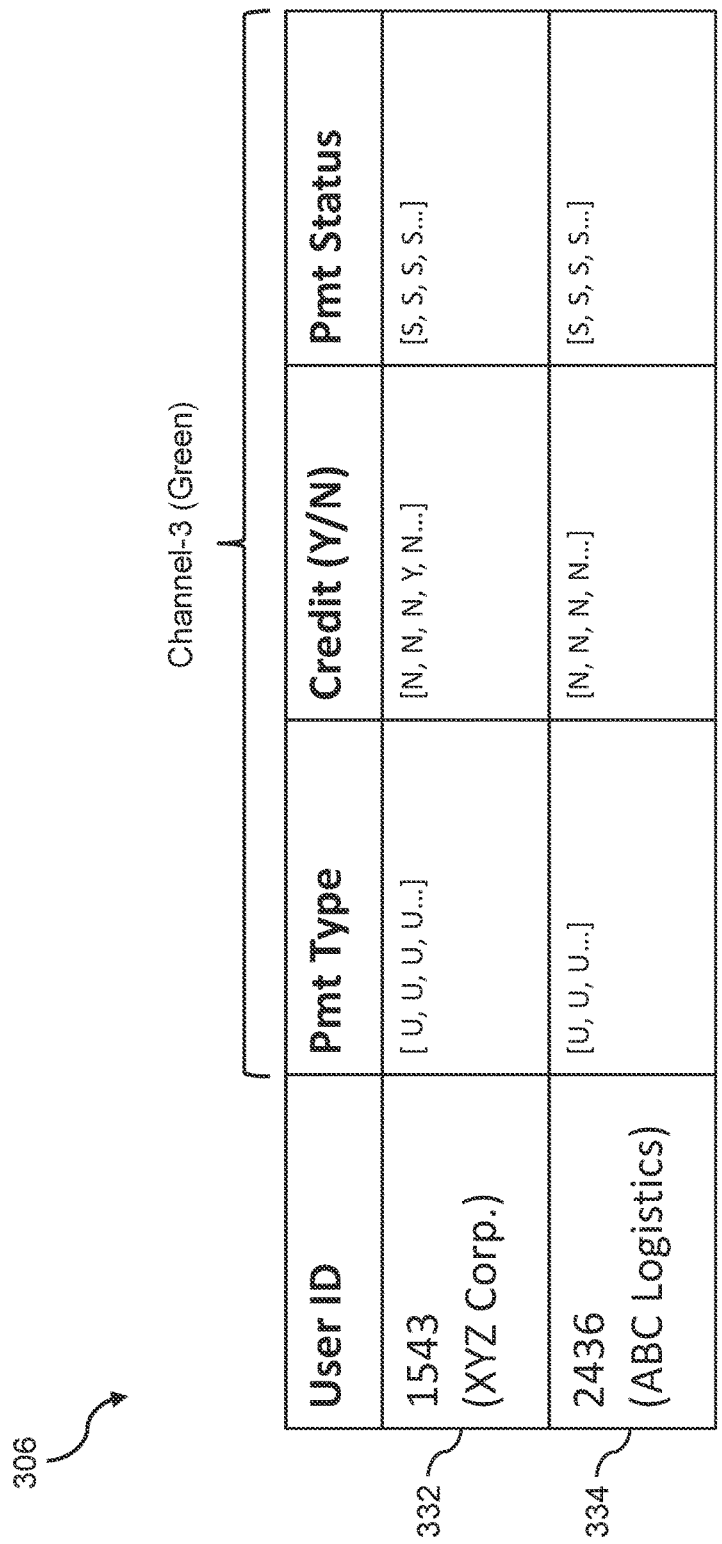

FIG. 3C illustrates example transactional characteristics associated with various accounts according to one embodiment of the disclosure. As shown, FIG. 3C includes a table 306 that is part of a database (e.g., part of the account database 136, etc.). The table 306 includes two rows 332 and 334 corresponding to different accounts. For example, the row 332 stores data associated with an account for a company called "XYZ Corp." while the row 334 stores data associated with an account for a company called "ABC Logistics." The transactional characteristics that are represented in the code generated by the data analysis module 132 (e.g., the code 206) may include characteristics related to a payment type, a credit usage, and a payment status, associated with transactions conducted by the respective entities. Additional transactional characteristics that are not shown in the table 306 may also be represented in the code.

In each of the rows 332 and 334, the table 306 presents a series of data under each transactional characteristic. For example, under the transactional characteristic "payment type," the table 306 includes a series of data representing payment types associated with payment transactions conducted by the respective entities. The different payment types may include a purchase payment type (e.g., a payment transaction related to a payment to a merchant for goods and services, etc.), a fund transfer payment type (e.g., transferring of funds between friends and family, etc.), and possibly other types of payment. Under the transactional characteristic "credit usage," the table 306 includes a series of data representing whether credit has been used in the several past payment transactions conducted by the respective entities. The series of data under the "credit usage" characteristic may include a "Y" indicator indicating that a credit has been used or an "N" indicator indicating that a credit has not been used in the corresponding payment transactions. Under the transactional characteristic "payment status," the table 306 includes a series of data representing payment statuses for the several past payment transactions conducted by the respective entities. The series of data under the "payment status" characteristic may include an "S" indicator indicating that a payment transaction is completed, a "C" indicator indicating that a chargeback has occurred for a corresponding payment transaction, or other statuses.

In this example, the row 332 indicates that the company "XYZ Corp." has been conducting transactions under the same payment type (e.g., a purchase payment type, etc.) during the past several payment transactions. The row 332 also indicates that the company "XYZ Corp." has not been using credit in most of the previous payment transactions except for one transaction, and all of the previous transactions have been completed. The row 334 indicates that the company "ABC Logistics" has also been conducting transactions under the same payment type (e.g., a purchase payment type, etc.) during the past several payment transactions, has not been using credit in all of the previous payment transactions, and that all of the payment transactions have been completed.

In some embodiments, the data analysis module 132 may determine whether a change has occurred in any one of the transactional characteristics for an account (e.g., the account 202) based on the table 306, and may generate change data based on any changes indicated in the table 306. The data analysis module 132 may then generate the third intermediate code for an account (e.g., the account 202) based on the change data, for example, by highlighting the area(s) that correspond to the change characteristic(s) in the corresponding format (e.g., filling the area(s) in green, etc.).

The data analysis module 132 may then merge the first, second, and third intermediate codes to generate the merged code (e.g., the code 206) for the account 202 using the techniques disclosed herein. Based on the different formats used for different characteristic categories in highlighting areas in the code 206, any changes to the different characteristics (that belong to different characteristic categories) can be clearly presented. In addition, due to the merging of the different highlights associated with the different characteristic categories (e.g., merging of different colors, merging of different patterns, etc.) in the code 206, any overlapping changes that occur across two or more characteristic categories within the same time frame can be exhibited in the code 206.

As such, certain characteristic change patterns associated with the account 202, that would be relevant in analyzing the account 202 and/or transactions involving the account 202, but are not apparent and/or easily determined based on data stored in other data formats and/or representations (e.g., in a database structure, in a graph structure, etc.), can be derived from the code 206. For example, the code 206 may indicate any concurrent changes (e.g., changes that occurred within the same time frame) to characteristics in two or more categories for an account. The code 206 may also indicate a frequency of changes occurred during the time period, and one or more periods of activity and inactivity for an account.

Figure 4A:
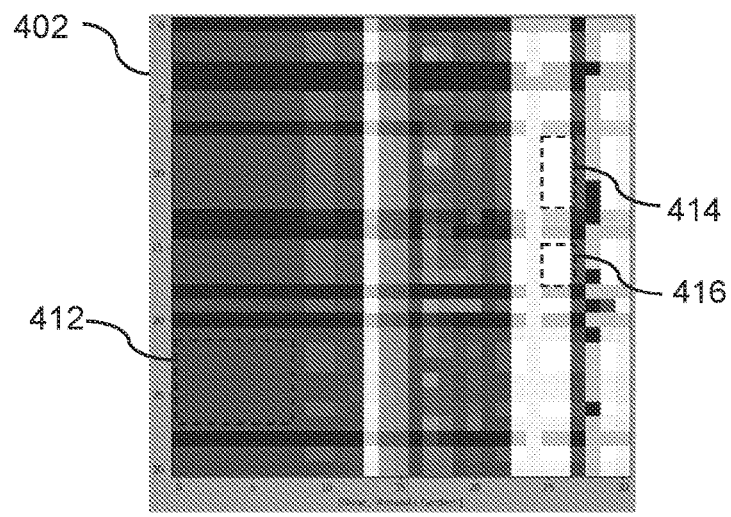
FIGS. 4A-4C illustrate example codes that represent changes to accounts according to an embodiment of the present disclosure.
Figure 4B:
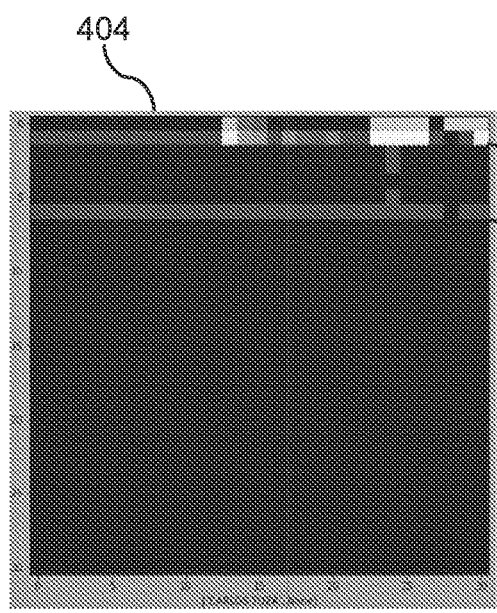
Figure 4C:
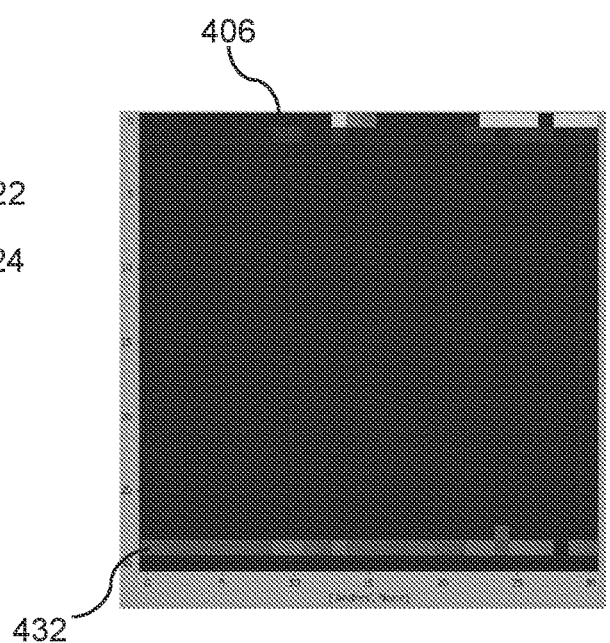

FIGS. 4A, 4B, and 4C illustrate example merged codes 402, 404, and 406 generated by the data analysis module 132 for different accounts according to one embodiment of the disclosure. As shown, the merged codes 402, 404, and 406 exhibit different change patterns for the respective accounts. For example, FIG. 4A illustrates the merged code 402 that comprises mostly highlighted areas. In fact, almost the entire code is highlighted in this example. Furthermore, while the majority portion of the highlighted areas (e.g., the area 412) are highlighted in red (indicating changes in demographic characteristics of the corresponding account), certain portions of the highlighted areas indicate a mixed color. For example, the portions 414 and 416 are filled with bright white color, a result of mixing all three colors red, blue, and green, which indicates that characteristics in all three categories have experienced changes during the corresponding time frames.

FIG. 4B illustrates the merged code 404 that includes mostly unfilled areas, except for the portions 422 and 424 at the top of the code 404, indicating that the account has been inactive for a long period of time until the recent days. FIG. 4C illustrates the merged code 406 that includes mostly unfilled areas, except for the portion 432 at the bottom of the code 406, indicating that the account was active a long time ago, and has been inactive since. Based on how the codes are merged, how to read or interpret the merged codes may be provided to the system (e.g., a user or computing module).

By analyzing the different change patterns of the accounts based on the codes, the data analysis module 132 may determine new insights related to the accounts. The new insights may be used to perform different actions related to the accounts. For example, the data analysis module 132 may use the change patterns of an account to assess a risk associated with the account and/or a transaction involving the account. For example, when the service provider server 130 receives a request for processing a transaction through an account of a user (e.g., a request for logging in to the account, a request for accessing data controlled by the service provider server 130, a request for performing an electronic payment transaction, etc.), the data analysis module 132 may analyze a risk of the account and/or the transaction based on a merged code generated for the account.

In some embodiments, the data analysis module 132 may configure and train a machine learning model (e.g., an artificial neural network, etc.) to predict a risk associated with an account based on attributes associated with a merged code (e.g., the code 206). The training of the machine learning model may involve updating (e.g., modifying an internal structure of the machine learning model) iteratively based on feedback from the training data, such that the machine learning model learns the different patterns from the codes in the training data. In some embodiments, the machine learning model may be configured to accept an image representation of the code as an input for predicting the risk. In some embodiments, the data analysis module 132 may encode the merged code into a set of attributes. The set of attributes may indicate areas within the code that are highlighted, and the attributes of the highlighted areas (e.g., the colors of the highlighted areas, etc.). The data analysis module 132 may then configure the machine learning model to accept the set of attributes as input values for predicting the risk. The data analysis module 132 may then determine a risk for the first user account based on an output from the machine learning model. The data analysis module 132 may transmit the determined risk (e.g., a risk score) to the service provider server 130 so that the service provider server 130 may process the transaction request based on the risk (e.g., authorize the transaction when the risk is below a threshold and deny the transaction when the risk is above the threshold, etc.).

When the transaction involves another account (e.g., a payment transaction between two accounts, etc.), the data analysis module 132 may retrieve the codes generated for the two accounts. In some embodiments, the data analysis module 132 may analyze the codes together, and may assess a risk for the transaction based on the analysis. For example, the data analysis module 132 may compare the change patterns of the two accounts based on the two codes, and may determine a risk associated with the transaction based on the comparison. In some embodiments, the data analysis module 132 may configure and train a machine learning model to predict a risk based on attributes associated with two codes. In some embodiments, the data analysis module 132 may determine that the two codes share a common change pattern. The data analysis module 132 may then determine whether the common change pattern corresponds to a malicious change pattern (e.g., a change pattern that is exhibited in codes representing known malicious user accounts, etc.), and may increase a risk of the transaction when the common change pattern corresponds to the malicious change pattern and take an appropriate action, such as rejecting the transaction, flagging the account, requiring additional authentication, etc.

In some embodiments, the data analysis module 132 may cluster (e.g., using a clustering algorithm such as a k-means clustering algorithm, etc.) the code generated for the account with other codes that exhibit similar patterns. The data analysis module 132 may then analyze the other user accounts associated with the codes within the same cluster, and may assess a risk associated with the first user account based on the analysis of the other user accounts. For example, if the data analysis module 132 determines that over a threshold number (or percentage) of user accounts within the cluster corresponds to malicious user accounts (e.g., user accounts through which fraudulent transactions have been conducted), the data analysis module 132 may increase the risk associated with the first user account.

Figure 5:
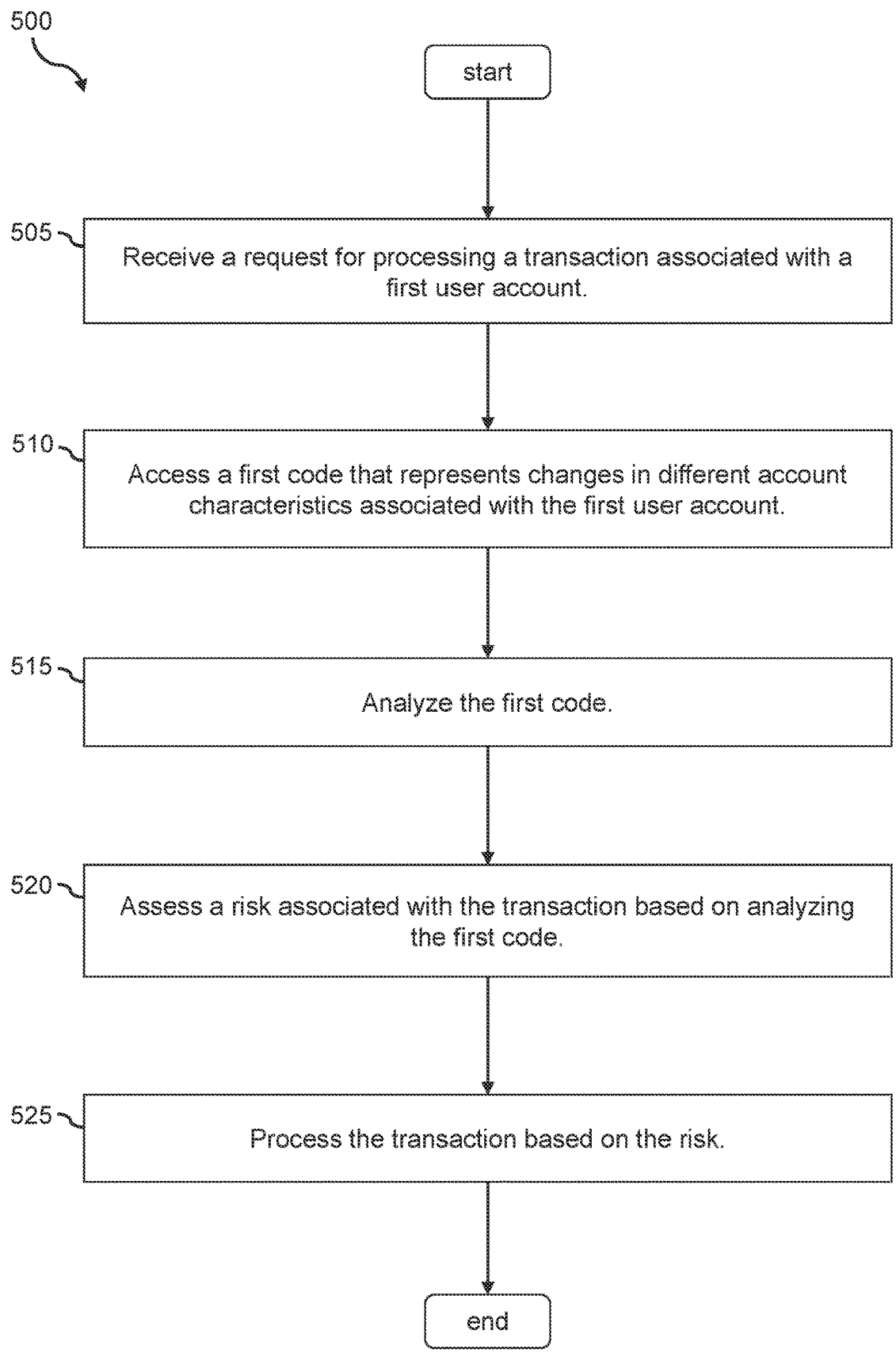
FIG. 5 is a flowchart showing a process of using a code that represent changes to an account to analyze a risk of the account according to an embodiment of the present disclosure.

FIG. 5 illustrates a process 500 for processing a transaction based on a merged code according to various embodiments of the disclosure. In some embodiments, at least a portion of the process 500 may be performed by the data analysis module 132. The process 500 begins by receiving (at step 505) a request for processing a transaction associated with a first user account and accesses (at step 510) a first code that represents changes in different account characteristics associated with the first user account. For example, upon receiving a transaction request for processing a transaction associated with a user account, the service provider server 130 may request the data analysis module 132 to determine a risk associated with the user account and/or the transaction. The data analysis module 132 may determine the risk without a direct request, but may instead initiate the determination automatically or from another trigger, such as receiving an indication of a transaction being initiated from an account or a suspect account. The data analysis module 132 may retrieve a code (e.g., the code 206) generated for the user account. The code represents changes to different account characteristics for the user account.

The process 500 then analyzes (at step 515) the first code and assesses (at step 520) a risk associated with the transaction based on analyzing the first code. For example, the data analysis module 132 may use one or more methods to analyze the code generated for the user account. In some embodiments, the data analysis module 132 may encode the code into a set of attributes, and provide the set of attributes as input values to a machine learning model that is configured and trained to predict a risk associated with an account based on the code. The data analysis module 132 may determine a risk for the transaction based on an output from the machine learning model.

The process 500 processes (at step 525) the transaction based on the risk. For example, the data analysis module 132 and/or another component of the service provider server 130 may process the transaction based on the risk determined for the user account. In some embodiments, the data analysis module 132 and/or the other component may authorize the transaction if the risk is below a predetermined value or deny the transaction if the risk is above the predetermined value.

Figure 6:
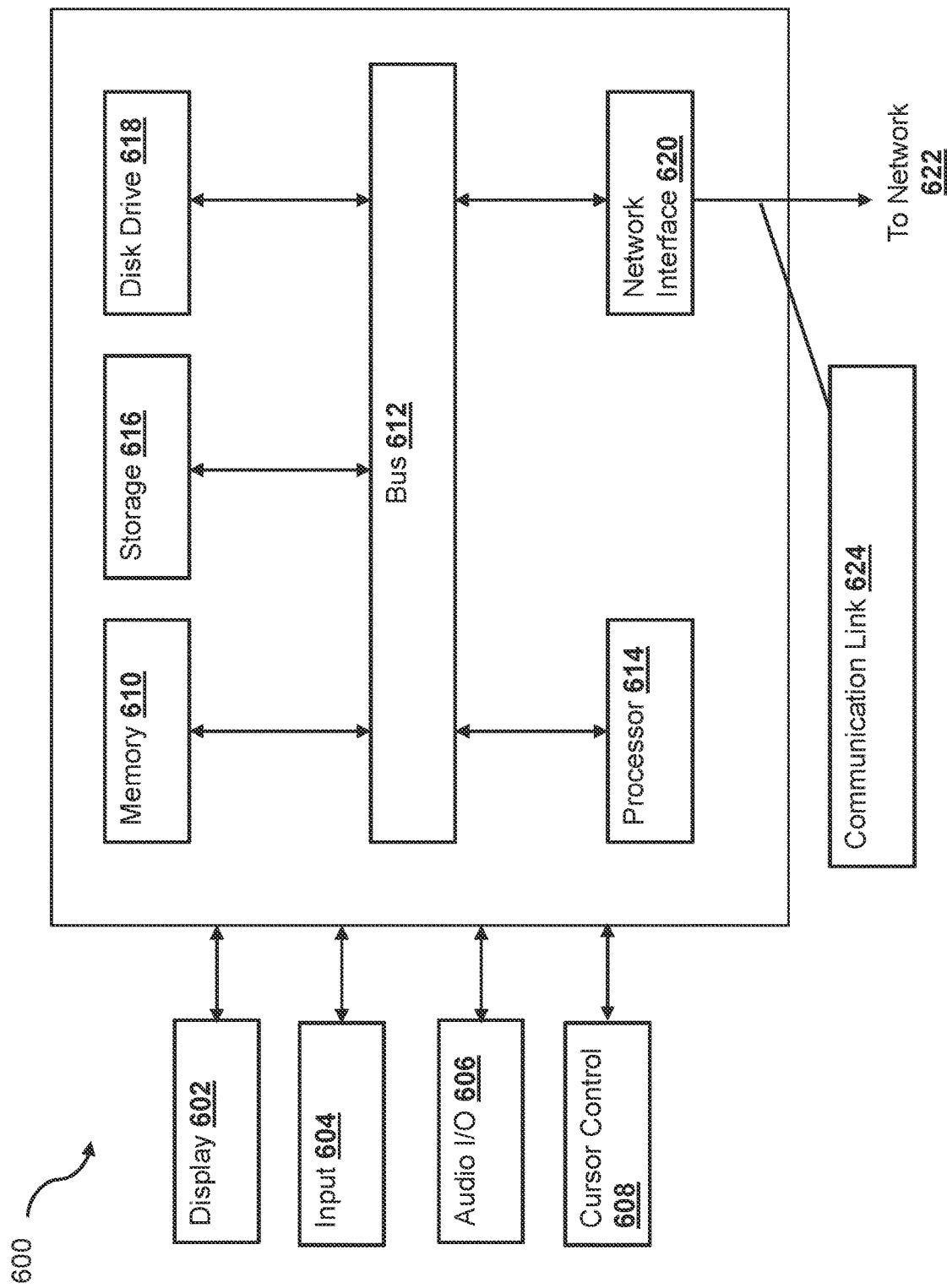
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant server 120, and the user devices 110 and 180. In various implementations, each of the user devices 110 and 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 180, 120, and 130 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via a network 622. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the data analysis functionalities described herein, for example, according to the process 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
detecting first changes to a first plurality of characteristics corresponding to a first characteristic category and associated with a user account of a user based on monitoring device input interactions of the user with an electronic user interface associated with the system over a time period;
generating a first machine-readable code for representing the first changes associated with the user account during the time period, wherein the first machine-readable code comprises (i) a first dimension representing a plurality of time frames within the time period and (ii) a second dimension representing the first plurality of characteristics, and wherein a first change of the first changes to a first characteristic in the first plurality of characteristics occurring in a first time frame of the plurality of time frames is represented by a first color in a first block corresponding to the first characteristic and the first time frame in the first machine-readable code;

detecting second changes to a second plurality of characteristics corresponding to a second characteristic category and associated with the user account based on monitoring transactional behavior of the user with the system over the time period;

generating a second machine-readable code for representing the second changes associated with the user account during the time period, wherein the second machine-readable code comprises (i) the first dimension representing the plurality of time frames within the time period and (ii) a third dimension representing the second plurality of account characteristics, and wherein a second change of the second changes to a second characteristic in the second plurality of characteristics occurring within a second time frame of the plurality of time frames is represented by a second color in a second block corresponding to the second characteristic and the second time frame in the second machine-readable code;

generating a merged code based on merging the first machine-readable code and the second machine-readable code along the first dimension, wherein the merged code combines representations of a portion of the first changes and a portion of the second changes that occur within a same time frame;

providing color values associated with the merged code to a machine learning model, wherein the machine learning model is configured to (i) detect at least one area in the merged code represented by a third color that is a combination of the first color and the second color based on the color values associated with the merged code, (ii) determine at least one overlapping change between the first account characteristic and the second account characteristic within a particular time frame of the plurality of time frames based on the at least one area detected in the merged code, and (iii) generate an output indicating a change pattern associated with the user account based on the at least one overlapping change; and processing a transaction request based on the output of the machine learning model, wherein the processing the transaction comprises authorizing the transaction, denying the transaction, or prompting the user for additional information.

2. The system of claim 1, wherein the operations further comprise:
assessing an attribute associated with the user account based on the at least one overlapping change within the particular time frame, wherein the processing the transaction request is further based on the risk.

3. The system of claim 1, wherein the device input behavior comprises at least one of a clicking action or a cursor movement.

4. The system of claim 1, wherein the operations further comprise:
assigning a plurality of codes to a plurality of clusters based on attributes associated with the plurality of codes;
determining, from the plurality of clusters, a particular cluster to which the merged code is assigned;
determining a set of user accounts represented by a set of codes assigned to the particular cluster; and
assessing an attribute associated with the user account based on data associated with the set of user accounts, wherein the processing the transaction request is further based on the attribute.

5. The system of claim 1, wherein the user account is a first user account, wherein the transaction request corresponds to a transaction between the first user account and a second user account, wherein the merged code is a first merged code, and wherein the operations further comprise:
accessing a second merged code associated with the second user account and the time period; and
determining one or more shared attributes between the first merged code and the second merged code, wherein the processing the transaction request is further based on the one or more shared attributes.

6. The system of claim 5, wherein the operations further comprise:
determining that the one or more shared attributes correspond to a particular malicious activity; and
in response to determining that the one or more shared attributes correspond to the particular malicious activity, denying the transaction.

7. A method, comprising:
detecting, by a computer system, first changes to a first plurality of account characteristics corresponding to a first characteristic category and associated with a user account of a user based on monitoring a first type of interaction behavior of the user with the computer system during a time period;
generating, by the computer system, a first machine-readable code for representing the first changes associated with the user account during the time period, wherein the first machine-readable code comprises (i) a first dimension representing a plurality of time frames within the time period and (ii) a second dimension representing the first plurality of account characteristics, and wherein a first change of the first changes to a first characteristic in the first plurality of characteristics occurring in a first time frame of the plurality of time frames is represented by a first visual representation in a first block corresponding to the first characteristic and the first time frame in the first machine-readable code;
detecting, by the computer system, second changes to a second plurality of characteristics corresponding to a second characteristic category and associated with the user account based on monitoring a second type of interaction behavior of the user with the computer system during the time period;
generating, by the computer system, a second machine-readable code for representing the second changes associated with the user account during the time period, wherein the second machine-readable code (i) comprises the first dimension representing the plurality of time frames within the time period and (ii) a third dimension representing the second plurality of account characteristics, and wherein a second change of the second changes to a second characteristic in the second plurality of characteristics occurring within a second time frame of the plurality of time frames is represented by a second visual representation in a second block corresponding to the second characteristic and the second time frame in the second machine-readable code;
generating, by the computer system, a merged code based on merging the first machine-readable code and the second machine-readable code;
providing, by the computer system, attributes associated with the merged code to a machine learning model configured to (i) detect at least one area in the merged code represented by a third visual representation that is a combination of the first visual representation and the second visual representation based on the attributes associated with the merged code, and (ii) determine one or more overlapping changes between the first account characteristic and the second account characteristic within a particular time frame of the plurality of time frames;

determining, by the computer system, a first attribute associated with the user account based on an output from the machine learning model; and processing, by the computer system, a transaction request associated with the user account based on the first attribute.

8. The method of claim 7, wherein the first characteristic category corresponding to a behavior category, and wherein the second characteristic category corresponds to a demographic category.

9. The method of claim 7, wherein the first account characteristic and the second account characteristic belong to two or more different characteristic categories.

10. The method of claim 9, wherein the two or more different characteristic categories comprise at least one of a demographic category, a behavioral category, or a transactional category.

11. The method of claim 7, wherein the user account is a first user account, wherein the transaction request is associated with a payment transaction between the first user account and a second user account, wherein the merged code is a first merged code, and wherein the method further comprises:

accessing a second merged code associated with the second user account and the time period;

extracting, from the second code, a second set of attributes; and obtaining, from the machine learning model, a second attribute associated with the second user account based on the second set of attributes, wherein the processing the transaction request is further based on the second attribute.

12. The method of claim 7, wherein the user account is a first user account, wherein the transaction request is associated with a payment transaction between the first user account and a second user account, wherein the merged code is a first merged code, and wherein the method further comprises:

accessing a second merged code associated with the second user account and the time period;

extracting, from the second merged code, a second set of attributes; and determining a common set of attributes between the first merged code and the second merged code, wherein the processing the transaction request is further based on the common set of attributes.

13. The method of claim 12, wherein the common set of attributes corresponds to a malicious activity.

14. A non-transitory machine-readable medium having stored thereon machine-readable instructions executable to cause a machine to perform operations comprising:

detecting first changes to a first plurality of characteristics corresponding to a first characteristic category and associated with a user account of a user based on monitoring device input behavior of the user during first interactions of the user with an electronic user interface over a time period comprising a plurality of time frames;

generating a first machine-readable code based on the first changes, wherein the first machine-readable code represents the first changes by a first type of representation in the first machine-readable code;

detecting second changes to a second plurality of characteristics corresponding to a second characteristic category and associated with the user account based on monitoring transactional behavior of the user during second interactions of the user with the electronic user interface over the time period;

generating a second machine-readable code based on the second changes, wherein the second machine-readable code represents the second changes by a second type of representation in the second machine-readable code;

generating a merged code based on merging the first machine-readable code and the second machine-readable code;

detecting one or more areas in the merged code represented by a third type of representation that is a combination of the first type of representation and the second type of representation;

determining one or more overlapping changes between a first characteristic from the first plurality of account characteristics and a second characteristic from the second plurality of characteristics within a particular time frame of the plurality of time frames based on the one or more areas detected in the merged code; and processing a transaction associated with the user account based on the one or more overlapping changes.

15. The non-transitory machine-readable medium of claim 14, wherein the operations further comprise:

assessing an attribute associated with the user account based on the one or more overlapping changes within the particular time frame, wherein the processing the transaction is further based on the attribute.

16. The non-transitory machine-readable medium of claim 14, wherein the first type of representation corresponds to a first color, wherein the second type of representation corresponds to a second color, and wherein the detecting the one or more areas comprises detecting the one or more areas within the merged code having a combined color based on the first color and the second color.

17. The non-transitory machine-readable medium of claim 14, wherein the operations further comprise:

assigning a plurality of codes to a plurality of clusters based on attributes associated with the plurality of codes;

determining, from the plurality of clusters, a particular cluster to which the merged code is assigned;

determining a set of user accounts represented by a set of codes assigned to the particular cluster; and assessing an attribute associated with the user account based on data associated with the set of user accounts, wherein the processing the transaction request is further based on the attribute.

18. The non-transitory machine-readable medium of claim 17, wherein the operations further comprise:

determining that one or more user accounts within the set of user accounts are associated with malicious users; and adjusting the attribute associated with the user account in response to the determining that the one or more user accounts are associated with malicious users.

19. The non-transitory machine-readable medium of claim 14, wherein the user account is a first user account, wherein the transaction is between the first user account and a second user account, wherein the merged code is a first merged code, and wherein the operations further comprise:

accessing a second merged code associated with the second user account and the time period; and determining one or more shared attributes between the first merged code and the second merged code, wherein the processing the transaction is further based on the one or more shared attributes.

20. The system of claim 1, wherein the user account is a first user account, wherein the transaction request is associated with a transaction between the first user account and a second user account, wherein the merged code is a first merged code, and wherein the operations further comprise:

accessing a second merged code associated with the second user account and the time period; and extracting, from the second code, a second set of attributes, wherein the processing the transaction request is further based on the second set of attributes.

* * * * *

UNITED STATES PATENT AND TRADEMARK OFFICE
CERTIFICATE OF CORRECTION

PATENT NO. : 12,443,960 B2
APPLICATION NO. : 18/052743
DATED : October 14, 2025
INVENTOR(S) : Suryadeep Tiwari et al.

It is certified that error appears in the above-identified patent and that said Letters Patent is hereby corrected as shown below:

In the Claims

Claim 14, Column 24, Lines 21-22, change "first plurality of account characteristics" to --first plurality of characteristics--.

Signed and Sealed this
Eighteenth Day of November, 2025

John A. Squires
*Director of the United States Patent and Trademark Office*